United States Patent [19]

Sakano et al.

[11] Patent Number: 4,942,513
[45] Date of Patent: Jul. 17, 1990

[54] TROUBLE DIAGNOSIS APPARATUS FOR CONTROLLED DEVICE

[75] Inventors: Makio Sakano, Ibaraki; Kiyoto Hirase, Sunto, both of Japan

[73] Assignee: Omron Tateisi Electronics Co., Kyoto, Japan

[21] Appl. No.: 197,914

[22] Filed: May 24, 1988

[30] Foreign Application Priority Data

May 25, 1987 [JP] Japan ................. 62-127753
May 25, 1987 [JP] Japan ................. 62-127754
May 25, 1987 [JP] Japan ................. 62-127756

[51] Int. Cl.[5] .................. G06F 15/46; G06F 11/00
[52] U.S. Cl. .................. 364/184; 364/140; 364/180; 364/900; 364/926.9; 364/949; 364/945.4; 371/29.1
[58] Field of Search ............. 364/184, 186, 140–147, 364/200 MS File, 900 MS File, 180; 371/20, 24, 25, 29, 29.1, 25.1, 20.4

[56] References Cited

U.S. PATENT DOCUMENTS

| | | | |
|---|---|---|---|
| 4,063,311 | 12/1977 | Jeremiah et al. | 371/29 X |
| 4,095,094 | 6/1978 | Struger et al. | 364/900 X |
| 4,422,140 | 12/1983 | Keats | 364/186 X |
| 4,514,846 | 4/1985 | Federico et al. | 364/200 X |
| 4,592,053 | 5/1986 | Matsuura | 364/184 X |
| 4,608,628 | 8/1986 | Saito et al. | 364/141 |
| 4,685,053 | 8/1987 | Hattori | 371/29 X |

FOREIGN PATENT DOCUMENTS

0208997A1 2/1986 European Pat. Off. .

OTHER PUBLICATIONS

JP 59-153209, Programmable Controller (Abstract only).
JP 59-106008, Sequence Monitoring Device (Abstract only).

*Primary Examiner*—Joseph Ruggiero
*Attorney, Agent, or Firm*—Stevens, Davis, Miller & Mosher

[57] ABSTRACT

Trouble of a plurality of controlled devices operating in asynchronism with each other can be diagnosed by only connecting a trouble diagnosis apparatus to the conventional programmable controller, without preparing a special trouble diagnosing program on the user program.

In another trouble diagnosis apparatus, the reference diagnosis input/output pattern series can be formed by first storing all the input/output pattern series and then deleting unchanged input/output from those to be diagnosed.

Further, another trouble diagnosis apparatus includes an input/output designation mode, an instruction mode and a diagnosis mode. In the input/output designation mode, operator can designate important input/output to be registered and deletes unimportant input/output from all the input/output to be diagnosed to find fault locations.

4 Claims, 17 Drawing Sheets

Fig. 6

```
                         t=0 t1 t2 t3 t4 t5 t6 t7 t8 t9 t10 t11 t12 t13 t14 t15 t16 t17 t18
INPUT SYSTEM   INPUT  I   1  1  1  1  1  0  0  0  0  0  0   0   0   0   0   0   0   0   0
               INPUT  II  0  0  0  0  0  0  0  0  1  1  1   1   1   0   0   0   0   0   0
OUTPUT SYSTEM  OUTPUT I   0  0  1  1  1  1  1  1  1  1  0   0   0   0   0   0   0   0   0
               OUTPUT II  0  1  1  1  1  1  1  1  1  1  1   1   1   1   1   1   1   0   0
```

Fig. 7

| STEP | I/O PATTERN |  |  |  | TIME |
|---|---|---|---|---|---|
|  | OUTPUT |  | INPUT |  |  |
|  | II | I | II | I |  |
| 0 | 1 | 0 | 0 | 1 | $t_0$ |
| 1 | 1 | 1 | 0 | 1 | $t_1$ |
| 2 | 1 | 0 | 1 | 0 | $t_{10}$ |
| 3 | 0 | 0 | 0 | 1 | $t_{18}$ |

Fig. 12

| | | | | | | | | | | | | |
|---|---|---|---|---|---|---|---|---|---|---|---|---|
| INPUT SYSTEM | INPUT I | 1 | 1 | 1 | 0 | 0 | 0 | 1 | 1 | 1 | 1 | 0 |
| | INPUT II | 0 | 0 | 0 | 0 | 0 | 0 | 0 | 0 | 0 | 0 | 0 |
| | INPUT III | 0 | 0 | 1 | 1 | 0 | 1 | 1 | 1 | 0 | 0 | 0 |
| OUTPUT SYSTEM | OUTPUT I | 1 | 1 | 1 | 1 | 1 | 1 | 1 | 1 | 1 | 1 | 1 |
| | OUTPUT II | 0 | 0 | 0 | 0 | 1 | 1 | 1 | 1 | 1 | 0 | 0 |
| | OUTPUT III | 0 | 1 | 1 | 1 | 1 | 1 | 1 | 0 | 0 | 0 | 0 |
| | TIME t | $t_0$ | $t_1$ | $t_2$ | $t_3$ | $t_4$ | $t_5$ | $t_6$ | $t_7$ | $t_8$ | $t_9$ | $t_{10}$ |

Fig. 13

| STEP | I/O PATTERN ||||||  |
|---|---|---|---|---|---|---|---|
| | OUTPUT ||| INPUT ||| |
| | I | II | III | I | II | III | |
| 0 | 1 | 0 | 0 | 1 | 0 | 0 | $t_0$ INITIAL VALUE |
| 1 | 1 | 0 | 1 | 1 | 0 | 0 | $t_1$ |
| 2 | 1 | 1 | 1 | 0 | 0 | 0 | $t_4$ |
| 3 | 1 | 1 | 0 | 1 | 0 | 1 | $t_7$ |
| 4 | 1 | 0 | 0 | 1 | 0 | 0 | $t_9$ |

| STEP | I/O PATTERN | | | | |
|---|---|---|---|---|---|
| | OUTPUT | | INPUT | | |
| | II | III | I | III | |
| 0 | 0 | 0 | 1 | 0 | $t_0$ |
| 1 | 0 | 1 | 1 | 0 | $t_1$ |
| 2 | 1 | 1 | 0 | 0 | $t_4$ |
| 3 | 1 | 0 | 1 | 1 | $t_7$ |
| 4 | 0 | 0 | 1 | 0 | $t_9$ |

Fig.19

| STEP | I/O PATTERN | | | |
| --- | --- | --- | --- | --- |
| | OUTPUT | | INPUT | |
| | II | III | I | II |
| 0 | 0 | 0 | 1 | 0 |
| 1 | 0 | 1 | 1 | 0 |
| 2 | 1 | 1 | 0 | 0 |
| 3 | 1 | 0 | 1 | 0 |
| 4 | 0 | 0 | 1 | 0 |

TROUBLE DIAGNOSIS APPARATUS FOR CONTROLLED DEVICE

BACKGROUND OF THE INVENTION

1. Field of the Invention

The present invention relates to a trouble diagnosis apparatus for a device controlled by a programmable controller.

2. Prior Art and Prior Application

Conventionally, when a device or devices controlled by a programmable controller develop trouble, the troubleshooter finds a fault location by observing the fault conditions or inspecting them through a synchroscope or multimeter.

However, this method takes much troubleshooting time and further requires a troubleshooter who has full knowledge of the sequence circuits and the device in order to securely find fault locations.

To overcome the above-mentioned problems, a model pattern of change in input/output signals obtained when the device is operating normally is previously formed manually, in order to check whether the actual pattern matches the model pattern when the device is operating by a diagnostic program incorporated in the programmable controller. In this method, however, there still exists a problem in that it takes much time to prepare the model pattern of input/output signal changes. Further, this model pattern can be prepared by only a person who has full knowledge of the sequence circuits. In addition, there exists a probability that trouble occurs at locations not represented by the model pattern.

As described above, where trouble diagnosis by the programmable controller is dependent upon such a method that input/output conditions anticipated when trouble occurs are previously examined by the user itself so as to be incorporated in the user program, complicated work is required for setting trouble conditions and programming. Therefore, once the user program has been completed, it is extremely troublesome to incorporate a trouble diagnosis program in the user program.

To overcome the above problem, a novel trouble diagnosis apparatus has been proposed in Japanese Patent Appln. No. 60-190658 (Laid Open No. 62-49518), in which a programmable controller is operated actually to learn the transition of input/output pattern conditions, and the normal operation is monitored by comparison between the previously learned pattern conditions and the actually operating pattern conditions.

In the diagnosis apparatus as described above, although the user itself need not set trouble conditions, there still exists a problem in that when a plurality of asynchronous controlled devices must be controlled simultaneously, it is difficult to accurately determine trouble conditions.

SUMMARY OF THE INVENTION

With these problems in mind, therefore, it is the primary object of the present invention to provide a trouble diagnosis apparatus in a programmable controller by which reference diagnosis data can be prepared easily, without depending upon a user's trouble diagnosis program, even when a plurality of asynchronous controlled devices are controlled simultaneously.

It is another object of the present invention to provide a trouble diagnosis apparatus in a programmable controller, by which a model pattern of input/output signal change obtained when a controlled device is operating under normal conditions is automatically prepared effectively, and further trouble diagnosis for the devices can be achieved without incorporating the trouble diagnosis program in the user program.

To achieve the above-mentioned object, a trouble diagnosis apparatus for devices controlled by a programmable controller for controlling a plurality of controlled devices to each of which a registered number is assigned, according to the present invention, comprises (a) mode setting means for selectively setting an operation mode to one of an instruction mode and a diagnosis mode; (b) instruction operation control means for causing the programmable controller to control a single designated control device when the instruction mode is set, monitoring a change in an output pattern of the programmable controller and storing changed input/output pattern in storage means in association with a registered number of the designated controlled device whenever the output pattern of the programmable controller changes; and (c) diagnosis operation control means for discriminating whether the input/output pattern of the programmable controller matches each input/output pattern constituting an input/output pattern series stored together with the registered number within each predetermined monitoring time period when the diagnosis mode is set, diagnosing that the controlled device develops trouble when the input/output pattern does not match, and informing locations at which the input/output pattern does not match the instructed and stored input/output pattern as fault locations of the controlled device related to the registered number.

According to the above-mentioned construction, since reference diagnosis data are automatically prepared for each registered device number when the instruction mode is set and since trouble diagnosis operation starts for each registered device number when the diagnosis mode is set, it is possible to securely diagnose each of a plurality of devices controlled by a single programmable controller in asynchronism with each other.

Further, a trouble diagnosis apparatus for a device controlled by a programmable controller, according to the present invention, comprises (a) mode setting means for selectively setting an operation mode to any one of an instruction mode and a diagnosis mode; (b) instruction operation control means for monitoring an output pattern of the programmable controller when the instruction mode is set, storing in sequence the changed input/output pattern whenever the output pattern changes, and deleting unchanged input/output of the obtained input/output pattern series from those to be diagnosed; and (c) diagnosis operation control means for discriminating whether an input/output of the programmable controller matches each input/output pattern constituting stored input/output pattern series within each predetermined monitoring time period when the diagnosis mode is set, diagnosing that the controlled device develops trouble when the input/output pattern does not match, and informing locations at which the input/output pattern does not match the instructed and stored input/output pattern as fault locations.

According to the above-mentioned construction, it is possible to automatically and effectively prepare a model pattern of input/output signal changes obtained when the controlled device is operating normally, and further it is possible to diagnose trouble of the controlled device without incorporating a trouble diagnosis program in the user program. In particular, since only the input/output pattern series related to trouble can be prepared automatically without storing unnecessary input/output patterns, it is possible to reduce the memory capacity markedly and implement a large-scale trouble diagnosis.

Further, a trouble diagnosis apparatus for a device controlled by a programmable controller, according to the present invention, comprises: (a) mode setting means for alternatively setting an operation mode to any one of an input/output designation mode, an instruction mode and a diagnosis mode; (b) input/output designation control means for designating registration of input/output to be diagnosed in the programmable controller or deletion of input/output to be excluded from diagnosis when the input/output designation mode is set; (c) instruction operation control mean for monitoring an output pattern of the programmable controller when the instruction mode is set, storing the changed input/output patterns whenever the output pattern changes, and deleting input/output designated as to be deleted from the obtained input/output pattern series to be diagnosed; and (d) diagnosis operation control means for discriminating whether an input/output pattern of the programmable controller matches each input/output pattern constituting stored input/output pattern series within each predetermined monitoring time period when the diagnosis mode is set, diagnosing that the controlled device develops trouble when the input/output pattern does not match, and informing locations at which the input/output pattern does not match the instructed and stored input/output pattern as fault locations.

According to the above-mentioned construction, when the input/output designation mode is set, it is possible to freely select input/output necessary or unnecessary for trouble diagnosis. Further, when the instruction mode is set, it is possible to automatically prepare only the instruction pattern of input/output data related to trouble. Further, when the diagnosis mode is set, it is possible to implement trouble diagnosis.

Since the input/output instruction pattern related to only to trouble can automatically be prepared by designating the input/output, it is possible to markedly save memory capacity without storing unnecessary input/output patterns, so that more reliable trouble diagnosis can be attained.

BRIEF DESCRIPTION OF THE DRAWINGS

FIGS. 1 to 8 show a first embodiment of the present invention;

FIG. 1 is a block diagram showing a programmable controller to which the present invention is applied;

FIG. 2 is a detailed block diagram showing a trouble diagnosis unit;

FIG. 3 shows a general flowchart for assistance in explaining the operation of the trouble diagnosis unit;

FIG. 4 shows a detailed flowchart for assistance in explaining the operation of the instruction operation control processing;

FIG. 6 is an illustration for assistance in explaining an example of input/output pattern transition;

FIG. 7 is a memory map showing the contents (the reference input/output patterns, in particular) of the memory unit;

FIG. 8 is a memory map showing the entire construction (monitoring timer area, registered No. etc., in particular) of the memory unit;

FIGS. 9 to 15 show a second embodiment of the present invention;

FIG. 9 is a flowchart for assistance in explaining the operation of the first instruction operation control processing;

FIG. 10 is a flowchart for assistance in explaining the operation of the second instruction operation control processing;

FIG. 12 is an illustration for assistance in explaining an example of input/output pattern transition;

FIG. 13 is an illustration for assistance in explaining the reference input/output patterns prepared by the first instruction operation;

FIG. 14 is an illustration for assistance in explaining the reference input/output patterns prepared by the second instruction operation;

FIG. 15 is a memory map showing the entire construction of the memory unit;

FIGS. 16 to 19 show the third embodiment of the present invention;

FIG. 16 is a general flowchart for assistance in explaining the operation of the trouble diagnosis apparatus;

FIG. 17 is a flowchart for assistance in explaining the operation of the input/output designation operation control processing;

FIG. 18 is a flowchart for assistance in explaining the operation of the second instruction operation control processing; and FIG. 19 is an illustration for assistance in explaining the reference input/output patterns prepared by the second instruction operation.

DETAILED DESCRIPTION OF THE PREFERRED EMBODIMENT

Figure 1:
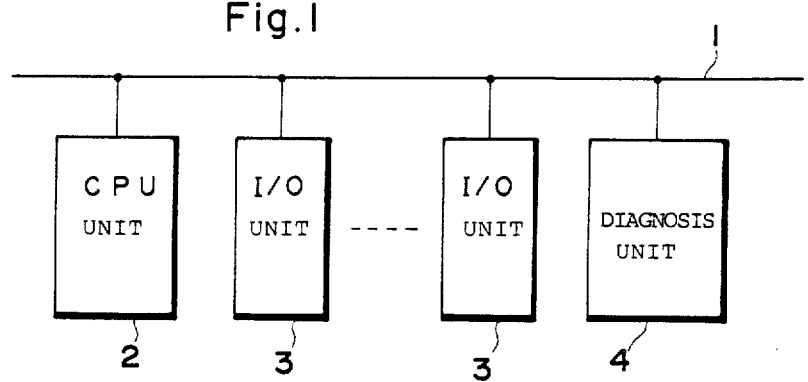

FIG. 1 is a block diagram showing a system configuration of a programmable controller of building block type to which the present invention is applied.

In the drawing, the programmable controller system comprises a system bus 1, a CPU unit 2; a plurality of I/O units 3, and a trouble diagnosis unit 4 related to the present invention. Here, a power supply unit or other elements are omitted. A plurality of controlled devices (not shown) are connected to the I/O units 3, respectively. These controlled devices operate in accordance with a predetermined sequence under control of the programmable controller. A different registered number (0 to n) is assigned to each of these controlled devices, respectively.

Figure 2:
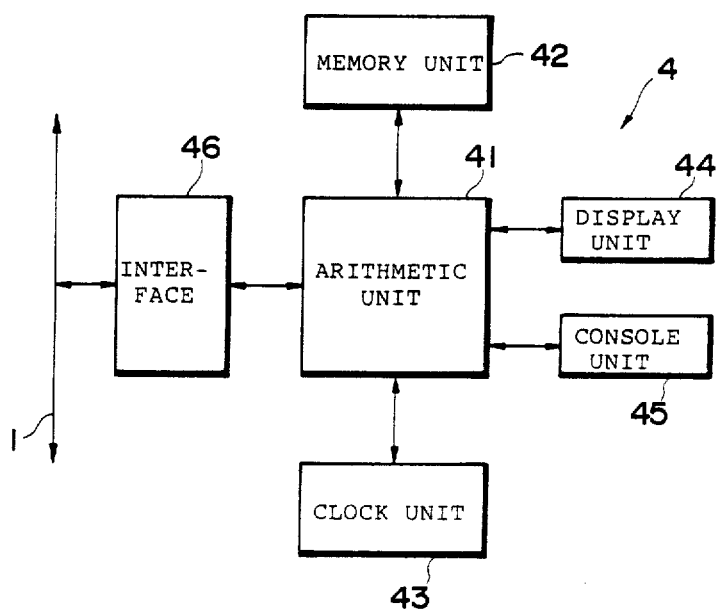

As shown in FIG. 2, the trouble diagnosis unit 4 comprises an arithmetic unit 41 composed of a microprocessor; a memory unit 42 composed of a RAM to store reference diagnostic data for each registered number of each controlled device; a clock unit 43 composed of a reference clock generator, counters, etc.; a display unit 44 for displaying input/output signals or data corresponding to fault locations and fault occurrence; and a console unit 45 for giving instructions as to mode selection, start, registered number setting, etc. Further, the arithmetic unit 41 is connected to the system bus 1 via an interface 46.

Figure 3:
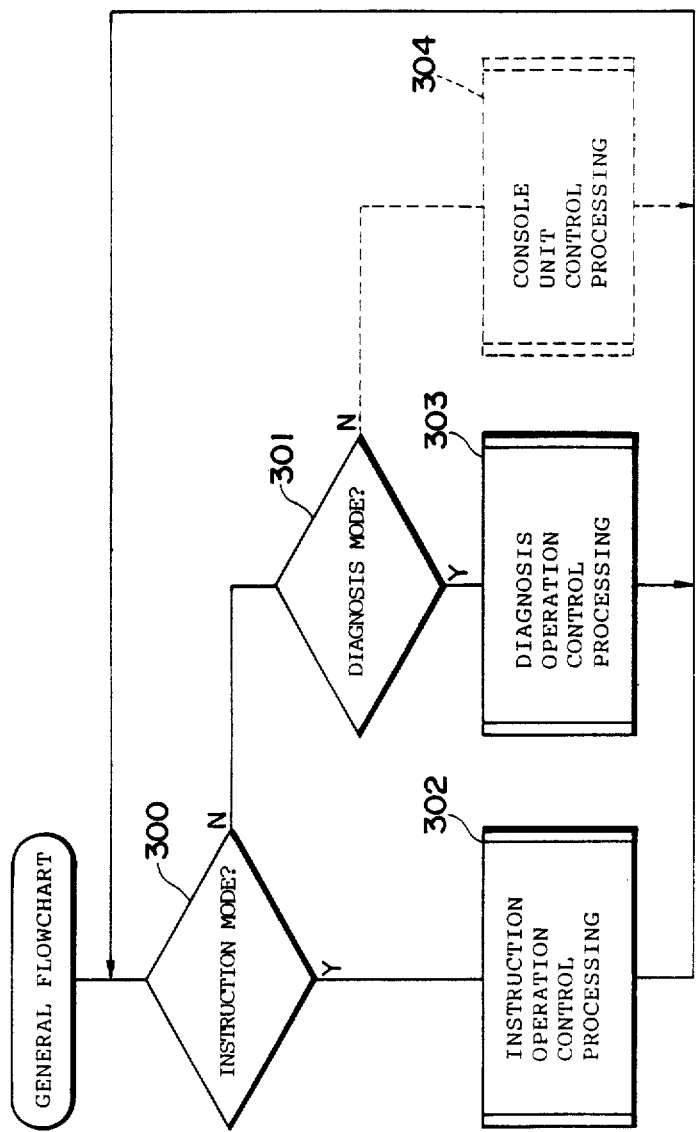

FIG. 3 shows a general flowchart of the operation of the trouble diagnosis unit 4 of the present invention. Control first checks whether the mode is set to an instruction mode or to a diagnosis mode through the console unit 45 (in steps 300 and 301). If the instruction mode is set (in step 300), instruction operation control processing is executed (in step 302). If the diagnosis mode is set (in step 301), diagnosis operation control processing is executed (in step 303), alternatively.

Further, if the mode is not set to the instruction mode or diagnosis modes (in steps 300 and 301), console unit control processing (registered number designation, monitoring timer data designation, various parameter settings, etc.) can be executed (in step 304). This console unit control processing (in step 304) can be executed in parallel with other processings, in practice. However, FIG. 3 represents the console unit control processing independently as a matter of convenience.

Figure 4:
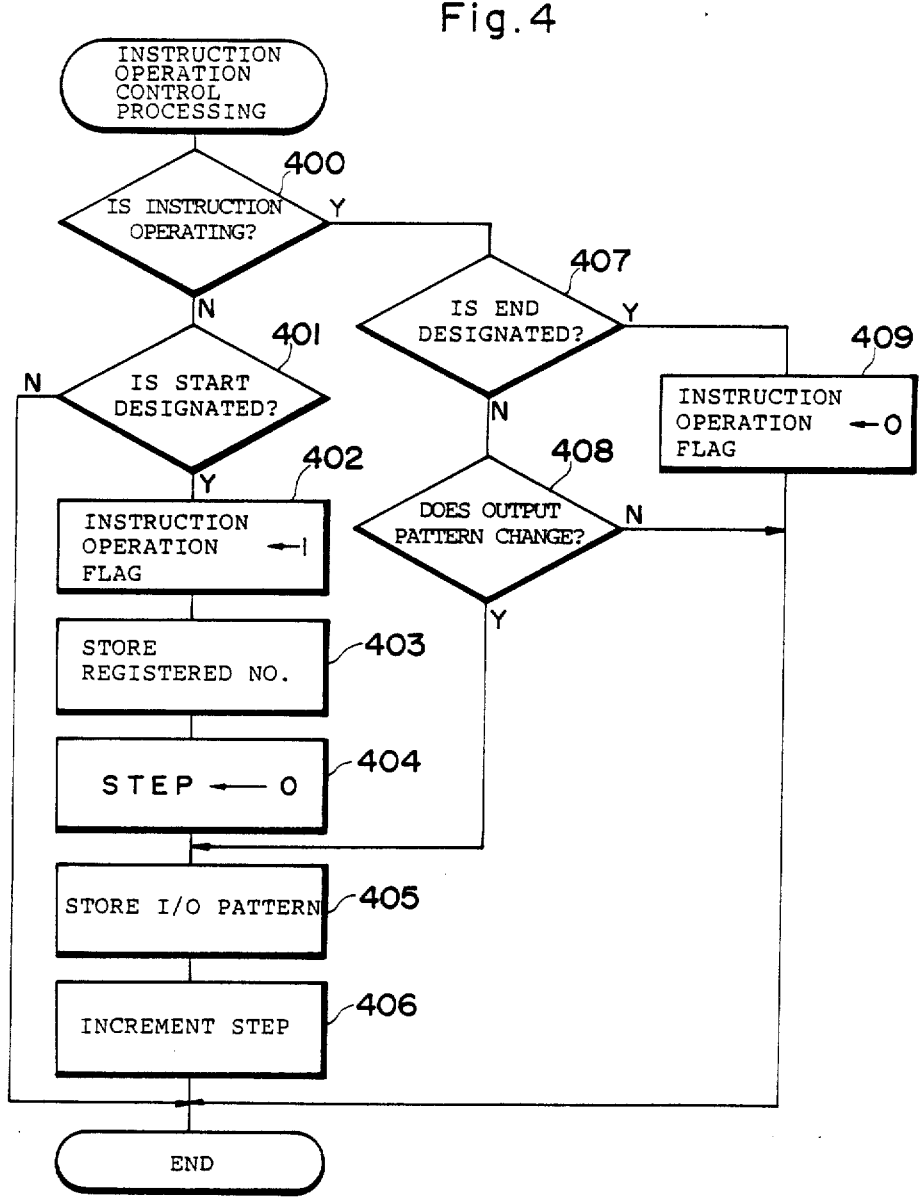

FIG. 4 shows the operation of the instruction operation control processing. Control first checks whether the instruction mode is operative (in step 400). If NOT (in step 400), control checks whether the instruction operation start assigned by a registered number is designated by the console unit 45 (in step 401). If YES (in step 401), an instruction operation flag is set to "1" (in step 402), and an inputted registered number related to an instruction is stored (in step 403). A step counter STEP is initialized to zero (in step 404). The input/output pattern at this time is stored as a STEP=0 data (in step 405). Thereafter, the step counter STEP is incremented (in step 406). Here, an input/output pattern implies an input signal pattern and an output signal pattern together, which represents a plurality of input/output signal conditions (represented by "1" or "0") of the programmable controller related to a registered control device.

When the succeeding instruction operation control processing is required, since YES (in step 400), control checks whether the instruction operation control processing end is designated (in step 407). If NO (in step 407), control checks whether the output pattern of the present time changes from the output pattern of the input/output pattern stored in previous step 405 (in step 408). If YES (in step 408), control stores the input/output pattern related to the present step designated by the step counter STEP (in step 405), and increments the step counter STEP (in step 406), repeating the above steps until the instruction operation control processing end is designated (in step 407). Further, if NO (in step 408), since the input/output pattern does not change, control proceeds to the succeeding processing as it is.

Here, the reason why change in an output pattern is checked will be described hereinbelow. The output signal pattern of the programmable controller changes according to the input signals thereof.

However, since there are various input signal forms such as analog input signals, relay input signals, etc., when the input/output signal pattern is sampled by detecting a change in input signals, the period of the input/output pattern (time transition) is not necessarily repeated in the same condition.

In addition, when a count instruction is executed in the user program, for instance, such a control that the number of inputs is counted and then the counted number is transferred to the output is very often executed. Therefore, if a change in input signals is detected for processing, since the number of changes is excessively great, the capacity of the memory for storing the input/output patterns becomes huge.

In contrast with this, when the input pattern and the output pattern are detected simultaneously at the time when the output pattern changes, it is possible to reduce the above-mentioned disadvantage and to check the influence of input signals upon output signals readily.

On the basis of the above a change in output pattern is detected and both the input/output patterns are registered.

If YES (in step 407), since instruction operation control processing end is designated, the instruction operation flag is reset to "0" to complete the processing (in step 409).

Therefore, when such a user program in which inputs I and II and output I change as shown in FIG. 6 is taken by way of example, since the output I changes at scanning times $t_1$ and $t_{10}$ during programmable controller operation, the changed input/output patterns are stored in sequence at memory locations corresponding to each step value of the registered number in the memory unit 42 as listed in FIG. 7, so that a set of reference diagnostic data can be obtained.

Figure 8:
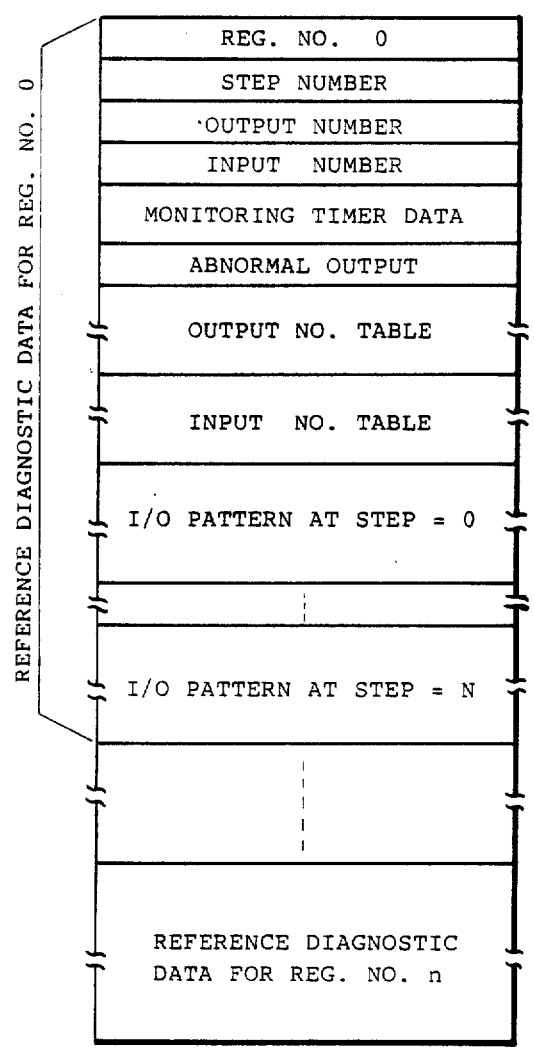

Further, as shown in FIG. 8, it is possible to store a plurality of the reference diagnostic data by preparing reference diagnostic data, in accordance with the processing explained with reference to FIG. 4, for each registered controlled device (with each registered No.) in sequence.

Since all input ports and output ports of the programmable controller are designated by numbers (Nos.), output Nos. and input Nos. to be diagnosed and corresponding to the controlled device are registered in the output No. table and the input No. table as shown in FIG. 8.

These input/output Nos. can be registered in the output No. table and the input No. table by depressing keys of the console unit 45 or automatically when the instruction operation ends. The automatic registration can be realized by deleting the input/output Nos. in which signals do not change in all the steps (described later in more detail in another embodiment) within the system.

Further, the monitoring timer data shown in FIG. 8 can be set by operating keys of the console unit 45 or automatically on the system side. In the case of the automatic setting, the maximum transition time (time between the preceding change in output signal and the succeeding change) of each input/output pattern is stored, and the timer data can be obtained easily by multiplying this maximum value by a constant. In summary, the magnitude of this monitoring timer data can be determined on the basis of the allowable time during which the mismatching of input/output patterns can be allowed when a controlled device develops trouble.

Further, it is also possible to store the reference diagnostic data prepared as described above in an external memory device (e.g. a floppy disk) by operating the console unit 45, as is well understood by those skill in the art.

As described above, where a plurality of devices are controlled simultaneously by a single programmable controller, since these devices are usually operating in asynchronism with each other, the input/output pattern transition is not necessarily the same, even if the input/output patterns are registered on the basis of time points at which output signals change.

In the diagnosis unit of the present invention, however, when a plurality of controlled devices are operated one by one without operating them simultaneously and changes in input/output patterns are stored for each registered number of the controlled device, it is possible to perform reliable trouble diagnosis by repeatedly using the same reference diagnostic data corresponding to each device operation. The trouble diagnosis operation control processing of this type will be described hereinbelow.

Figure 5A:
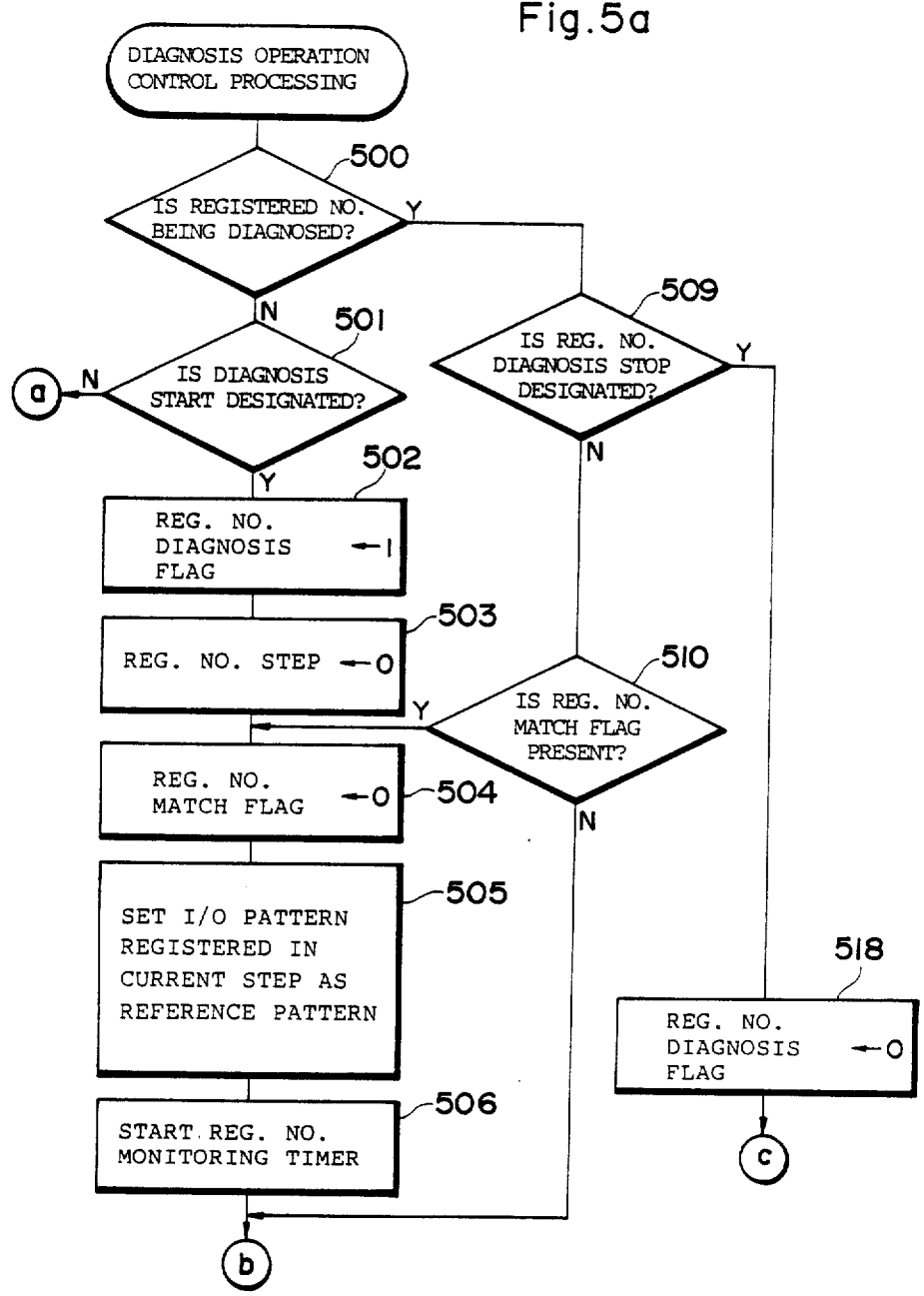
FIGS. 5a and 5b show detailed flowcharts for assistance in explaining the operation of the diagnosis operation control processing.
Figure 5B:
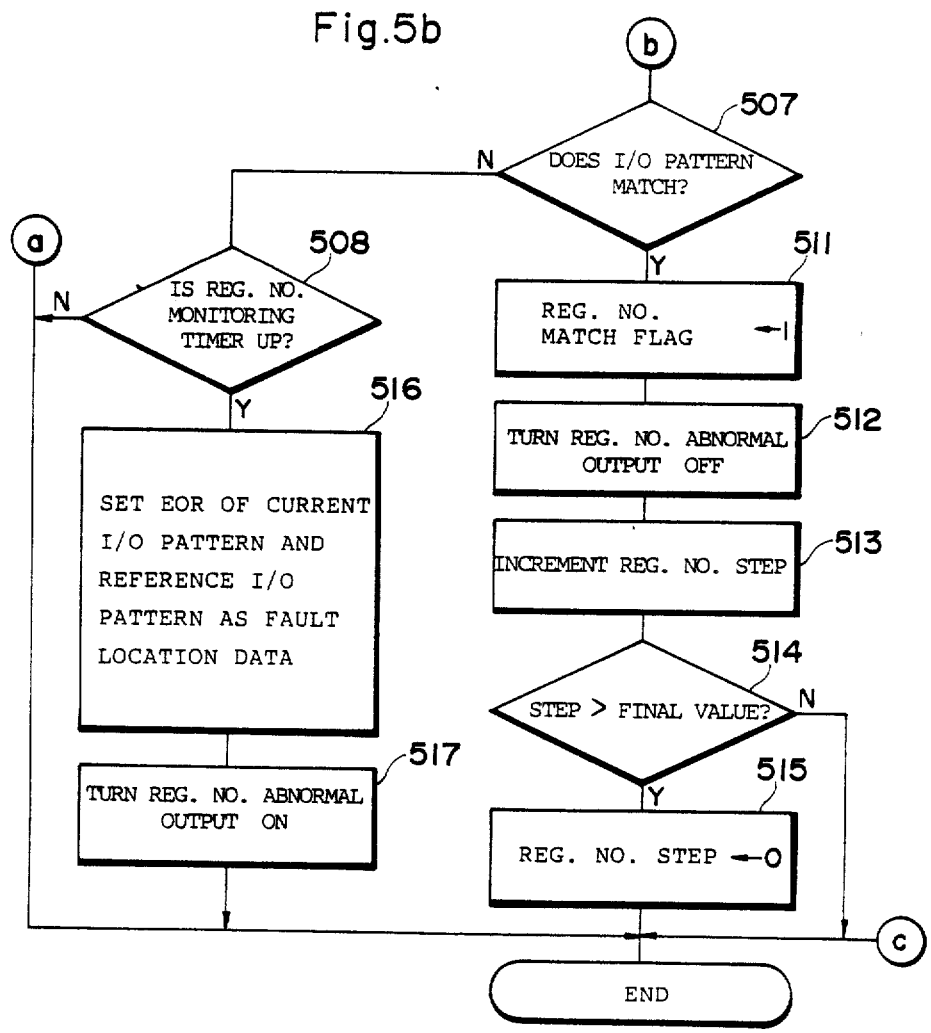

When the diagnosis mode is set by the console unit 45, the diagnosis operation control processing starts, as shown in FIG. 5. Control first checks whether the controlled device of the registered No. designated by the console unit is now being diagnosed (in step 500). If NO, control stands by a diagnosis start instruction (in step 501).

If NO (in step 500) but YES (in step 501), since diagnosis start is instructed, control sets the registered No. diagnosis flag to "1" (in step 502), and resets the registered No. step counter STEP to "0" and the registered No. match flag to "0" (in steps 503, 504) to start diagnosis operation.

In this diagnosis operation, control sets the input/output pattern (see FIG. 8) of the current STEP value ("0" at first) stored in the area of the registered No. designated as the reference input/output pattern (in step 505). Control sets the monitoring time data determined in step 304 shown in FIG. 3 to a monitoring timer, and starts the monitoring timer (in step 506). Thereafter, control checks whether the current input/output pattern specified by the input/output No. table matches the reference input/output pattern before the monitoring timer is up (in step 507).

When control confirms that the current input/output pattern specified by the input/output No. table matches the reference input/output pattern (YES in step 507) before the monitoring timer time is up (NO in step 508), control sets the registered No. match flag to "1" (in step 511), turns off the abnormal output (in step 512), and increments the registered No. step counter STEP (in step 513), repeating the above operations for the succeeding step.

From the succeeding step value to the diagnosis stop designation (YES in step 509), when the registered No. match flag is present (YES in step 510), the registration of the succeeding pattern (in step 504, 505) and the checking of pattern matching (in step 507) are repeated. On the other hand, when the registered No. match flag is absent (NO in step 510), the checking of pattern matching is repeated (in step 507).

For instance, when the input/output pattern does not match the reference pattern (in step 507), this diagnosis operation control processing ends (after NO in step 508). However, when the diagnosis operation control processing routine is called again after a predetermined time has elapsed, since NO (in step 510) after steps 500 and 509, a new input/output pattern is compared again with the reference pattern set (in step 505).

When the current input/output pattern does not match the reference input/output pattern before the monitoring timer time is up, the controlled device is determined to develop trouble. Therefore, when the monitoring timer time is up (YES in step 508), an exclusive OR sum of the current input/output pattern specified in the input/output No. table and the reference input/output pattern is found and set as fault location data (in step 516). An abnormal output (e.g. buzzer) for the corresponding control device is turned on (in step 517) and also displayed on the display unit 44. Therefore, it is possible to visually inform the operator of a fault locations where the current input/output pattern does not match the reference input/output pattern.

When the registered No. diagnosis stop is designated (in step 509), the diagnosis flag is reset to "0" (in step 518) and control processing ends.

As described above, since each registered controlled device is diagnosed independently, it is possible to diagnose trouble of a plurality of devices controlled by a single programmable controller in asynchronism with each other.

A second embodiment in which input/output data unchanged throughout all the steps are deleted will be described hereinbelow.

Figures 14, 15:
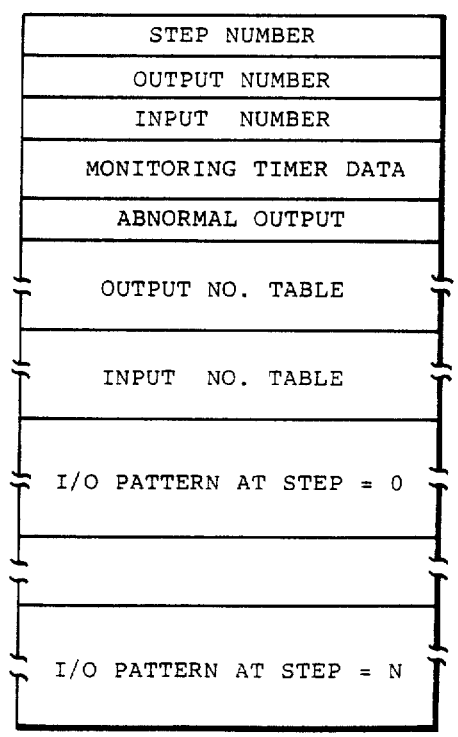

To this embodiment, the system configuration shown in FIG. 1, the trouble diagnosis unit configuration shown in FIG. 2, and the general flowchart shown in FIG. 3 are all applicable as they are. Further, in this embodiment, the number of the controlled device is assumed to be one for simplification. Therefore, in the console unit control processing (in step 304 in FIG. 3), various parameters are set but no registered number is designated. Further, the data necessary for a single controlled unit are stored in the memory unit 42 as shown in FIG. 15.

In this embodiment, the instruction operation control processing is divided into a first instruction operation and a second instruction operation. In the first instruction operation, input/output patterns are registered. In the second instruction operation, the input/output patterns registered in the first instruction operation are compressed as described later in more detail. The first instruction operation is roughly the same as the instruction operation shown in FIG. 4.

Figure 9:
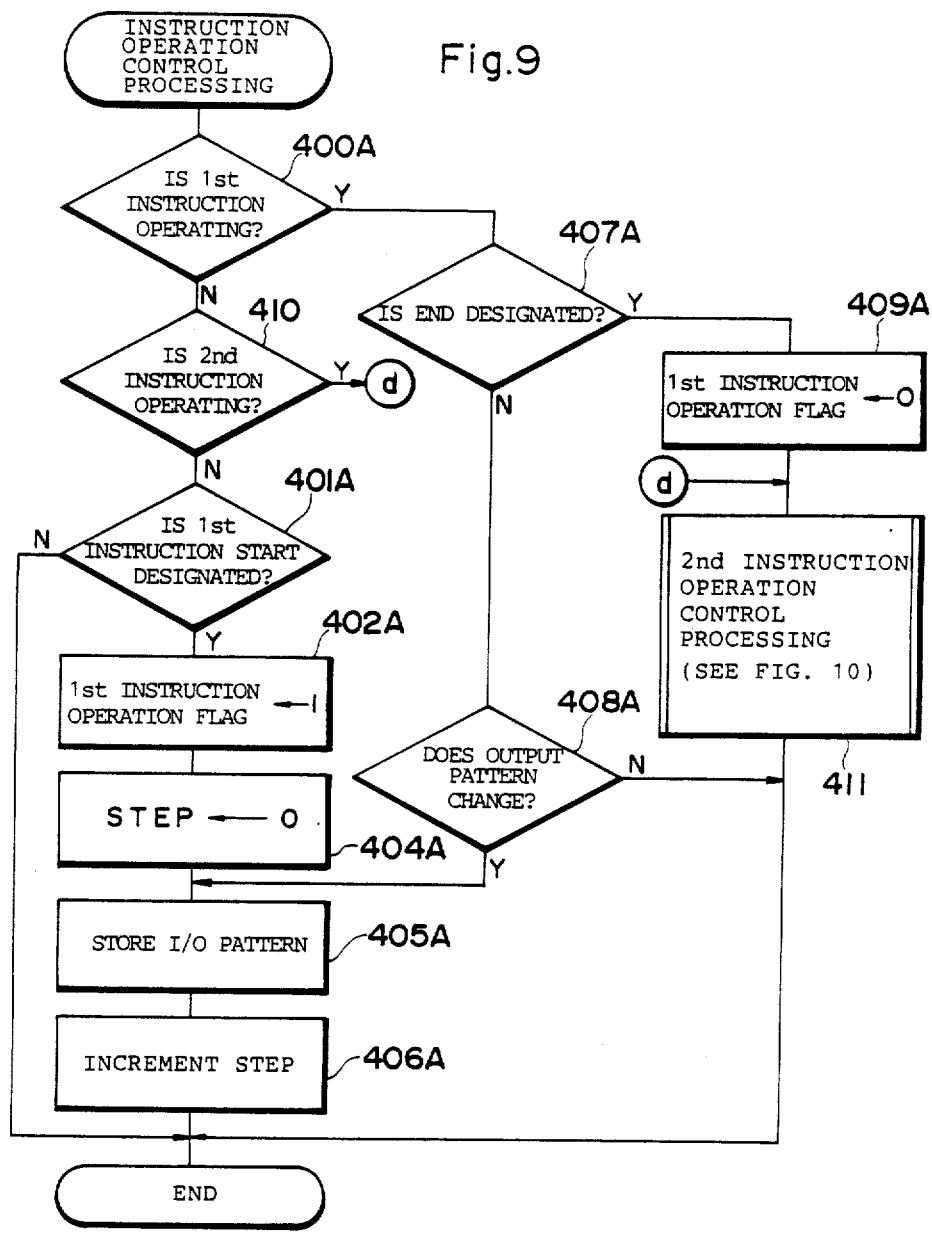

In the instruction operation control processing of the embodiment shown in FIG. 9, the corresponding steps as in FIG. 4 are denoted by the same reference numerals with A.

In FIG. 9, when the instruction operation control processing starts, control checks whether the control processing is the first instruction operation or not (in step 400A). If NO, control checks whether the control processing is the second instruction operation or not (in step 410). If NO, control checks whether the first instruction start is designated (in step 401A). If YES, control sets the first instruction operation flag to "1" (in step 402A) and initializes the step counter STEP to "0" (in step 404A).

Thereafter, control stores the current input/output pattern in a memory area designated by the step counter STEP as shown in FIG. 13 (in step 405A) and increments the step counter STEP (in step 406A).

When the succeeding instruction operation control processing is called, since the first instruction is operative (in step 400A), control checks whether the end is designated (in step 407A). If NO, control checks whether the output pattern changes (in step 408A).

Here, if YES, control stores the changed input/output pattern in an area designated by the step counter STEP as shown in FIG. 13 (in step 405A), increments the step counter STEP (in step 406A), continuing the processing, and repeats the above processing until the end is designated (in step 407A). Further, in the above processing, when the output pattern does not change (NO in step 408A), control proceeds to the next processing without execution.

In contrast with this, when control checks that the end is designated (YES in step 407A), control resets the first instruction operation flag to "0" (in step 409A) and executes the second instruction operation (in step 411).

As described above, as the result that the first instruction operation control processing is executed, when assumption is made that there are three inputs I, II, III and three outputs I, II, III as shown in FIG. 12, the input/output data change for each scanning execution of the user program as shown in FIG. 12, and the input/output patterns are stored, as shown in FIG. 13, at time points $t_1$, $t_4$, $t_7$ and $t_9$ at which the outputs change.

Figure 10:
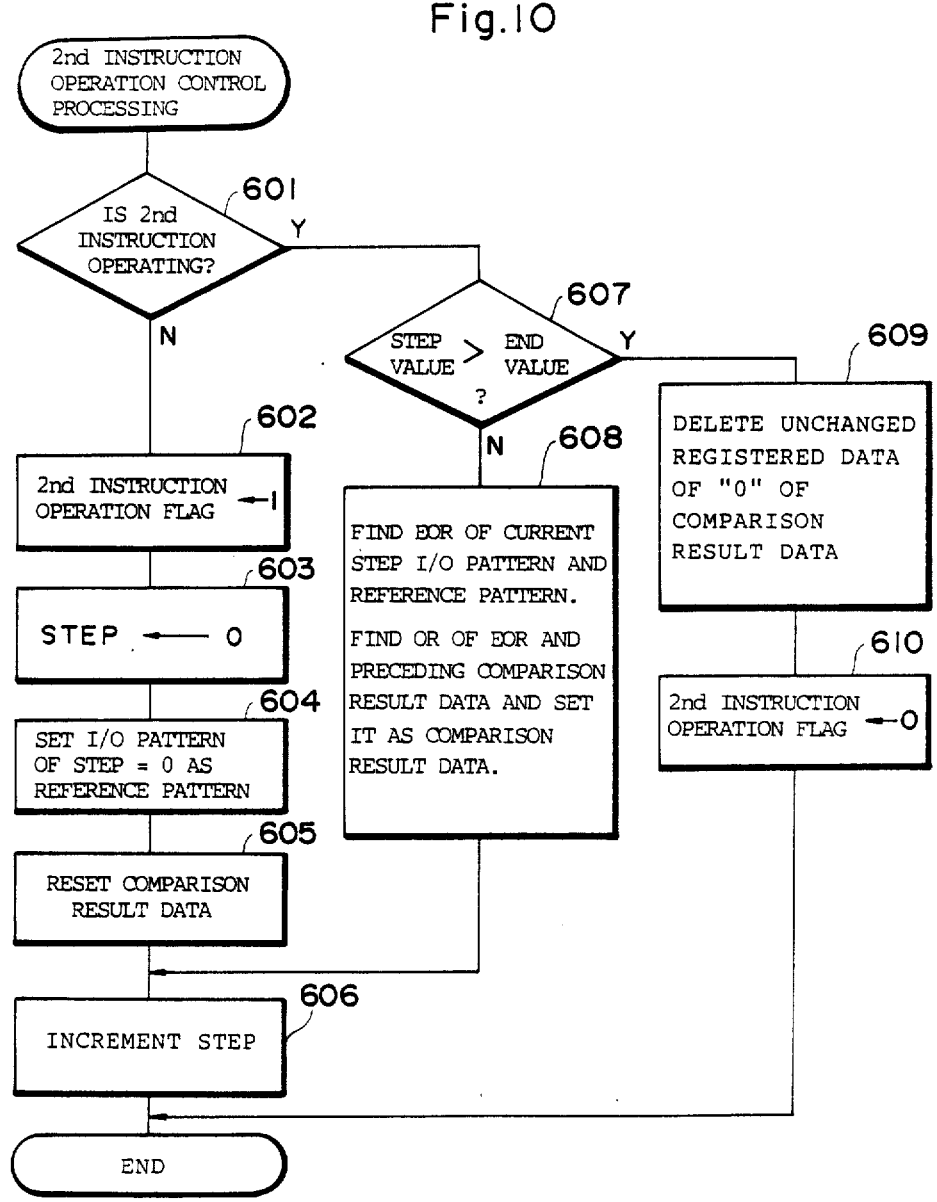

The second instruction operation control processing will be described. As shown in FIG. 10, when the second instruction operation starts, control first checks whether the control processing is the second instruction or not (in step 601). If NO, control sets the second instruction operation flag to "1" (in step 602), and initializes the step counter STEP to "0" (in step 603).

Thereafter, control sets the STEP=0 input/output pattern designated by the step counter STEP as the reference pattern (in step 604), and resets the comparison result data stored at a predetermined area of the memory unit or a register (in step 605), increments the step counter STEP (in step 606).

After a predetermined time has elapsed and when the second instruction operation is called, since the second instruction is operative (in step 601), control checks whether the STEP value exceeds the end value (in step 607). If NO, control finds an exclusive OR sum (EOR) of the input/output pattern of the current step value and the reference input/output pattern. In this step, only the input/output data which have changed in comparison with the reference input/output pattern are set to "1" on the comparison result data. Further, control finds a logical sum (OR) of the current and preceding comparison result data as a new comparison result data (in step 608). Thereafter, the STEP value is incremented (in step 606). Therefore, "1" is produced on the comparison result data when the input/output data change even once.

On the other hand, when the STEP value reaches (the final STEP value+1) (YES in step 607), control deletes the input/output data which shows "0" (unchanged) on the comparison result data, and simultaneously registers only the input/output No. to be diagnosed in an input/output No. table as shown in FIG. 15 (in step 609). Thereafter, control resets the second instruction operation flag to "0" (in step 610), completing the processing.

Here, the reason why unchanged input/output data are deleted from the memory unit will be described hereinbelow. The fact that input/output data do not change in instruction operation indicates that these input/output data are not used in instruction operation or no abnormal condition occurs (e.g. no alarm is produced). Since it is meaningless to monitor these data not used or not changed, these input/output data are deleted.

As described above, once the second instruction operation is executed, unchanged input/output data are deleted from the stored input/output data as shown in FIG. 13, and only the changed input/output data are stored as shown in FIG. 14.

Figure 11A:
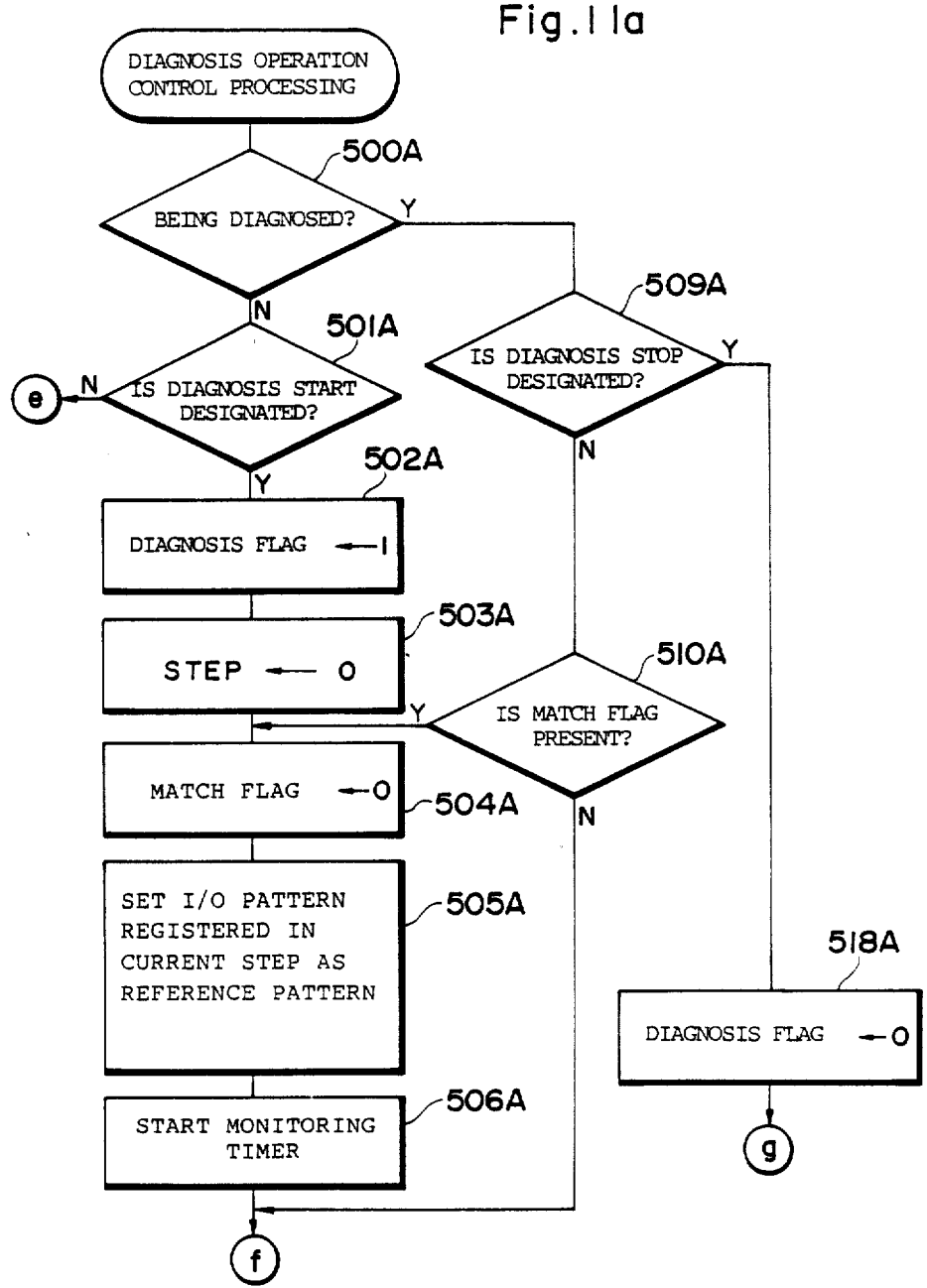
FIGS. 11a and 11b are flowcharts for assistance in explaining the operation of the diagnosis operation control processing.
Figure 11B:
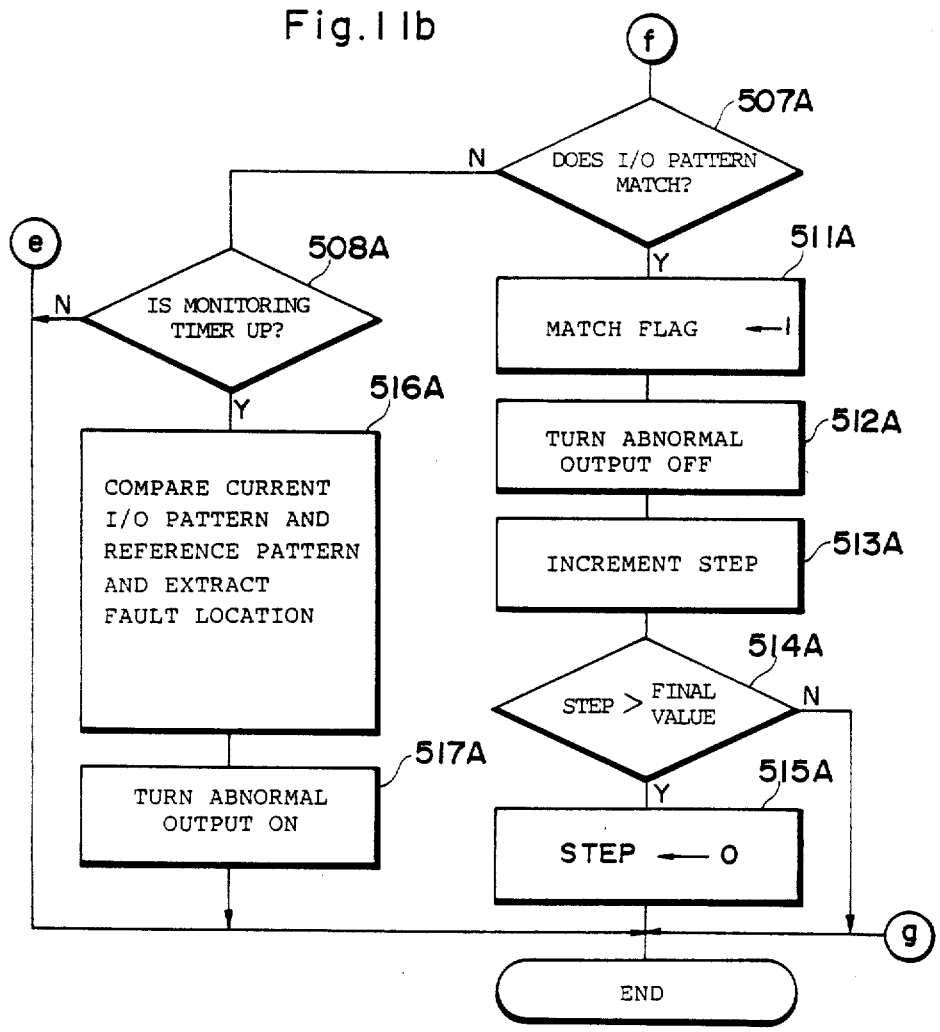

The diagnosis operation control on the basis of the stored input/output pattern series is the same as that shown in FIG. 5. In this embodiment, since the controlled device is one, description related to the registered No. designation is unnecessary. The diagnosis operation control processing is shown in FIG. 11, in which the corresponding steps as in FIG. 5 are designated by the same reference numerals with A.

In step 507A, the comparison between the current input/output pattern and the reference pattern is made for only the corresponding input/output data with reference to the input/output No. table, without comparison other input/output data with the reference pattern.

Further, the monitoring timer data can be determined by multiplying the times $(t_1-t_0)$, $(t_4-t_1)$, $(t_7-t_4)$, or $(t_9-t_7)$ by a predetermined constant, for instance.

The third embodiment by which it is possible to freely select input/output data necessary for trouble diagnosis or those unnecessary therefor will be described hereinbelow. The system configuration shown in FIG. 1 and the trouble diagnosis unit 4 shown in FIG. 2 can be applied to this embodiment as they are. Only a single controlled device is connected for simplification. The contents in the memory unit 42 are the same as in FIG. 15. FIGS. 12 to 14 are usable for assistance in explaining compression operation of input/output pattern.

Figure 16:
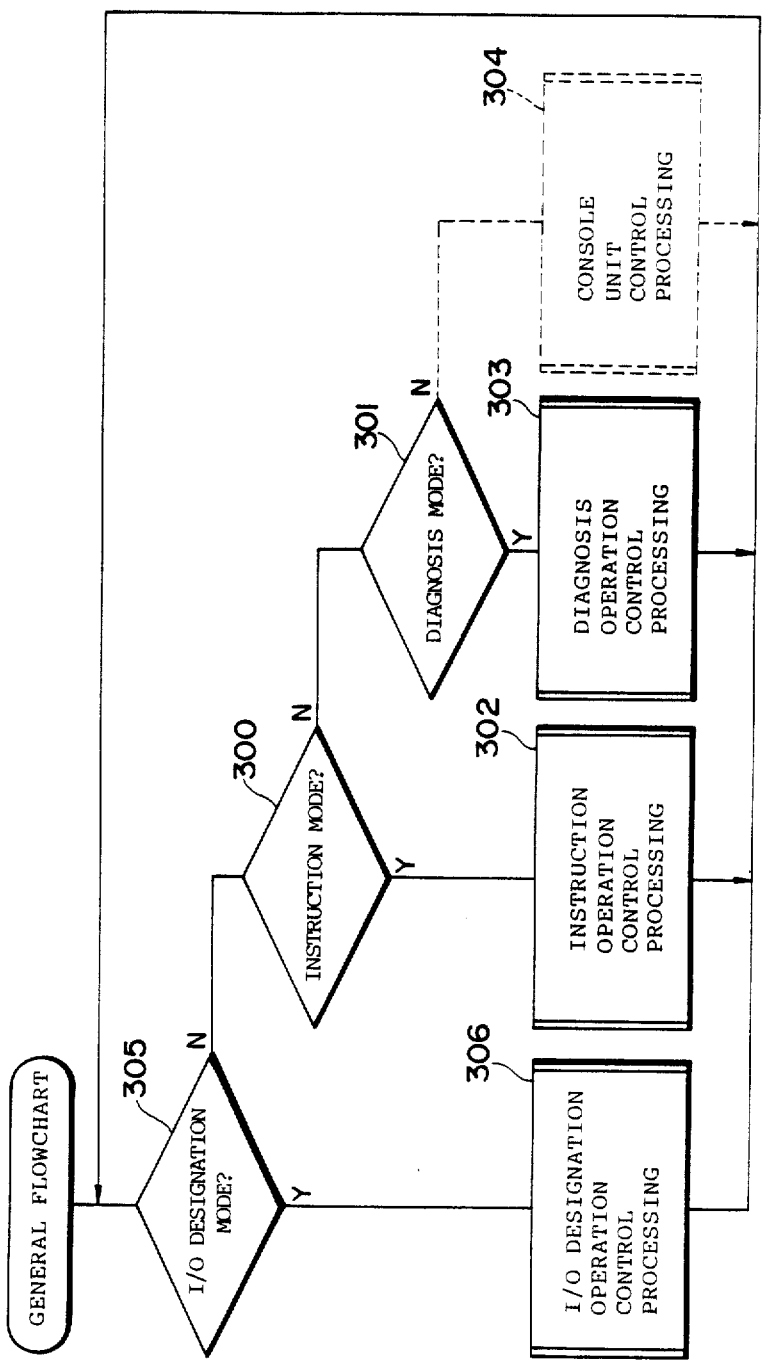

FIG. 16 is a general flowchart for assistance in explaining the operation of this embodiment, in which the same processings as in FIG. 3 are designated by the same reference numerals without repeating the description thereof.

In FIG. 16, when the operation of the trouble diagnosis unit 4 is set, by the mode selection through the console unit 45, to any one of an input/output designation mode (in step 305), an instruction mode (in step 300), and a diagnosis mode (in step 301), any one of an input/output designation operation control processing (in step 306), an instruction operation control processing (in step 302) and a diagnosis operation control processing (in step 303) is executed alternatively.

Figure 17:
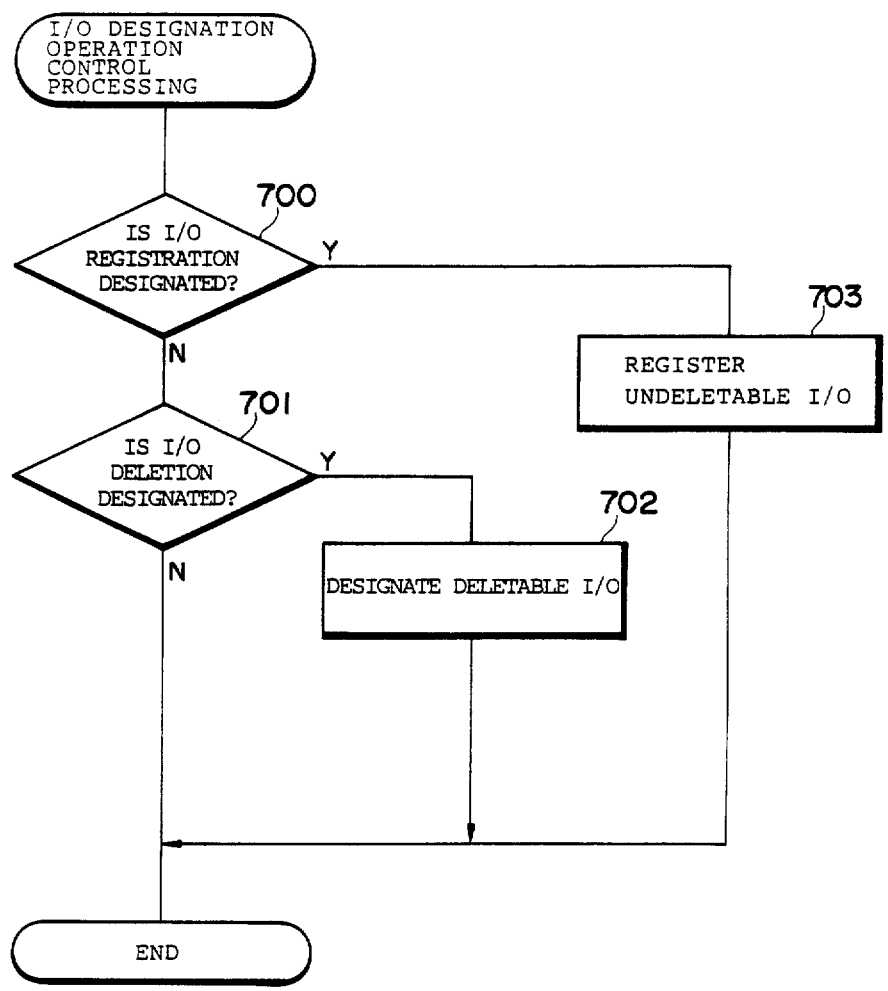

FIG. 17 shows the flowchart for assistance in explaining the input/output designation operation control processing. In this drawing, when the input/output designation operation control processing starts, control checks whether an input/output registration is designated or not (in step 700). If NO, control checks whether an input/output deletion is designated (in step 701). If YES, an input/output No. to be deleted is designated and stored (in step 702). On the other hand, if an input/output registration is designated (YES in step 700), undeletable input/output No. is designated and stored (in step 703).

The instruction operation control processing will be described. In the same way as in the second embodiment, the instruction operation control processing includes a first instruction operation and a second instruction operation. In the first instruction operation, an input/output patterns are registered. In the second instruction operation, an input/output patterns registered in the first instruction operation are compressed. The operation of the instruction operation control processing is substantially the same as that shown in FIG. 9, therefore the description thereof being omitted herein. On the basis of this instruction operation control processing, it is possible to obtain input/output patterns as shown in FIGS. 12 and 13.

Figure 18:
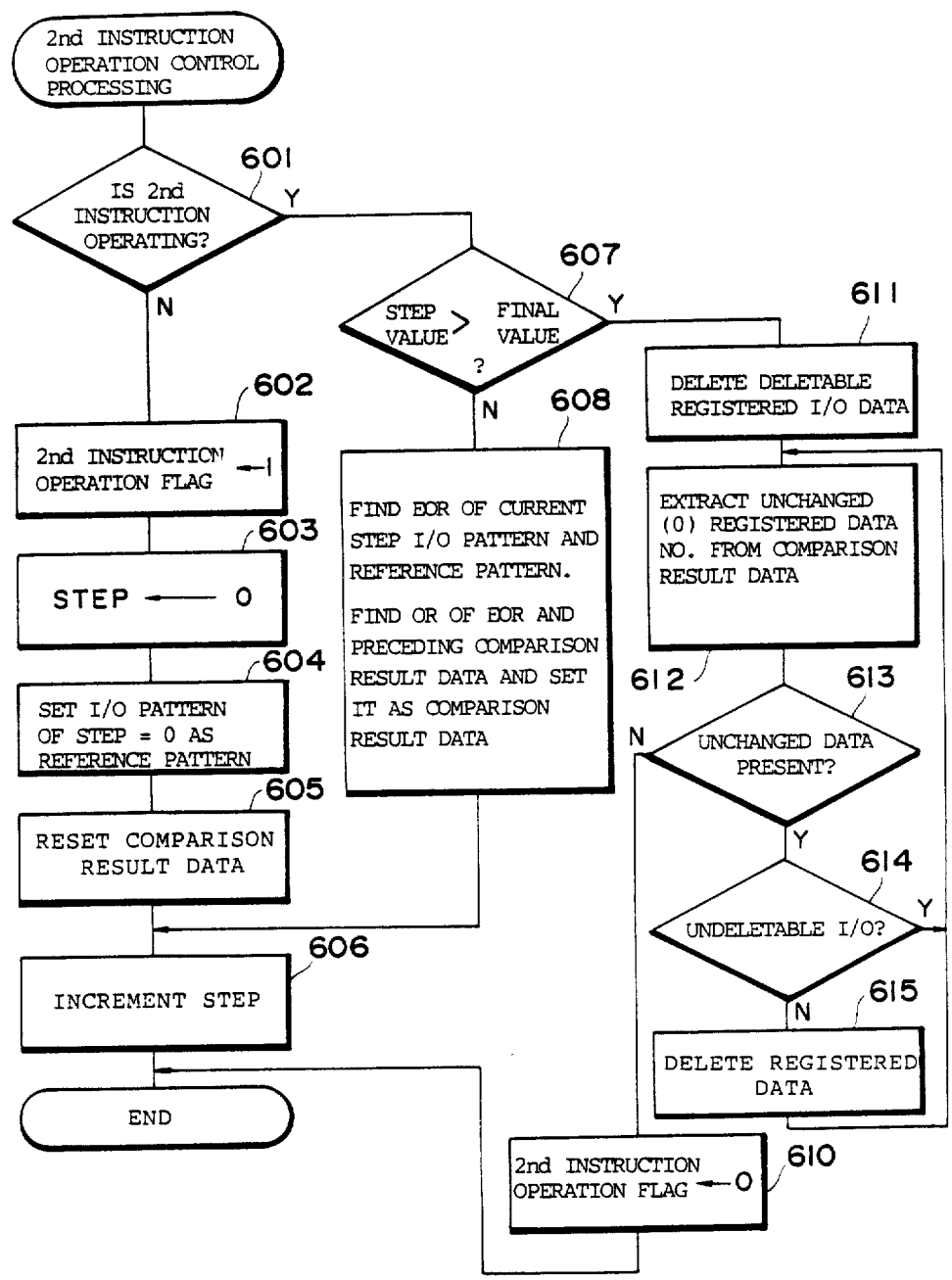

FIG. 18 shows the flowchart for assistance in explaining the second instruction operation control processing. Some steps in this processing are the same as in FIG. 10. The same reference numerals have been retained for the same steps, without repeating the description thereof. In FIG. 18, the deletion processing from step 611 to step 615 is different from that (step 609) shown in FIG. 10. Therefore, only the deletion processing will be described hereinbelow.

When the STEP value becomes (the final STEP value+1) (YES in step 607), control deletes registered input/output data designated as deletion (in step 611) and extracts registered data of "0" (unchanged) from the comparison result data (in step 612). Control checks whether unchanged input/output data are present (in step 613). If YES, control checks whether the unchanged input/output data cannot be deleted (in step 614). If NO (i.e. can be deleted), control deletes these data from the registered data (in step 615). If YES (in step 614), control returns to step 612 without data deletion.

When unchanged input/output data are absent or used out (in step 613), control resets the second instruction operation flag to "0" (in step 610), continuing the processing.

Here, assumption is made that an input II is designated as undeletable and an input III is designated as deletable in the input/output designation operation. In this case, an instruction pattern as shown in FIG. 19 can be prepared on the basis of the above second instruction operation. In more detail, although the input II do not change, since these data are designated as undeletable data, it is impossible to delete these data. On the other hand, although the input data III change, since these data are designated as deletable data, these data can be deleted. The above operation will be clarified in comparison between the input/output patterns shown in FIG. 19 and that shown in FIG. 14.

The reason why input/output data can manually be deleted or registered is as follows: when the device is in operation, there exist various input/output signals not directly related to the device operation such as input/output signals for display or those turned off under the normal conditions but on under abnormal conditions.

Therefore, when input/output signals are not at all deleted, there exists a possibility that control determines an abnormal condition when input/output data for display change (these data changes are not abnormal). Further, since input/output signals turned off under the normal condition but on under the abnormal condition do not change under the normal condition, when these data are deleted from the registered input/output data to be diagnosed, there exists a problem in that abnormality is not informed when these input/output signals are abnormal.

To avert the above-mentioned problems, input/output to be monitored can be registered manually and those not to be monitored can be deleted manually in order to implement more reliable diagnosis operation.

Further, the diagnosis control processing of this embodiment is substantially the same as that shown in FIG. 11.

We claim:

1. A trouble diagnosis apparatus for a plurality of devices controlled by a programmable controller, each of said plurality of devices having an assigned registered number, said apparatus comprising:
   (a) a mode setting means for selectively setting an operation mode to one of an instruction mode and a diagnosis mode;
   (b) an instruction operation control means, operative when said instruction mode is set, for causing the programmable controller to control a designated one of said controlled devices, for checking a change in an output data pattern of the controller, and for storing a changed input-output data pattern in storage means in association with a registered number of the designated controlled device whenever the output data pattern of the controller changes; and
   (c) a diagnosis operation control means, operating when said diagnosis mode is set, for discriminating whether each input/output data pattern constituting an input/output data pattern series stored together with a registered number in the storage means appears within each predetermined monitoring time period for a designated controlled device having said registered number assigned thereto, for diagnosing that the designated controlled device develops trouble when an input/output data pattern which is same as the stored input/output data pattern does not appear, and for identifying locations at which the input/output data pattern does not match the stored input/output data pattern as fault locations of the designated controlled device.

2. A trouble diagnosis apparatus for a device controlled by a programmable controller, comprising:
   (a) a mode setting means for selectively setting an operation mode to one of an instruction mode and a diagnosis mode;
   (b) an instruction operation control means for monitoring an output data pattern of the programmable controller when the instruction mode is set, storing in sequence a changed input/output data pattern whenever the output data pattern changes, and deleting an unchanged input/output data pattern of the obtained input/output data pattern series from those to be diagnosed; and
   (c) a diagnosis operation control means for discriminating whether each input/output data pattern constituting a stored input/output data pattern series for a designated control device appears within each predetermined monitoring time period when the diagnosis mode is set, diagnosing that the designated controlled device develops trouble when an input/output data pattern which is the same as the stored input/output data pattern does not appear during said monitoring time period, and identifying locations at which the same input/output data pattern does not appear as fault locations.

3. A trouble diagnosis apparatus for a device controlled by a programmable controller, comprising:
   (a) a mode setting means for setting an operation mode to any one of an input/output designation mode, an instruction mode and a diagnosis mode;
   (b) an input/output designation control means for designating a registration of input-output data to be diagnosed in the programmable controller or a deletion of input/output data to be excluded from diagnosis when the input/output designation mode is set;
   (c) an instruction operation control means for monitoring an output data pattern of the programmable controller for a designated device when the instruction mode is set, storing a changed input/output data pattern for the designated device whenever the output data pattern changes, and deleting input/output data designated for deletion from a obtained input/output data pattern series to be diagnosed; and (d) a diagnosis operation control means for discriminating whether an input/output data pattern of the programmable controller for a designated device matches each input/output data pattern constituting a stored input/output data pattern series within each predetermined monitoring time period for the designated device when the diagnosis mode is set, diagnosing that the designated device develops trouble when the input/output data pattern does not match, and identifying locations at which the input/output data pattern does not match the instructed and stored input/output data pattern as fault locations.

4. The trouble diagnosis apparatus of claim 3, wherein said instruction operation control means deletes unchanged input/output data of the obtained input/output data pattern from those to be diagnosed, but does not delete unchanged input/output data when the input/output data are registered for diagnosis.

* * * * *